Sept. 30, 1969  J. T. SCHRÖDER ET AL  3,469,678

EMERGENCY BRAKE FOR CONVEYORS

Filed July 25, 1967

INVENTORS
JORIS THEODOR SCHRÖDER
GERD-GÜNTHER DUBE
BY W. L. Hunter ATTORNEY

United States Patent Office 3,469,678
Patented Sept. 30, 1969

3,469,678
EMERGENCY BRAKE FOR CONVEYORS
Joris Theodor Schröder and Gerd-Günther Dube, Berlin, Germany, assignors to Otis Elevator Company, New York, N.Y., a corporation of New Jersey
Filed July 25, 1967, Ser. No. 655,885
Int. Cl. B65g 43/00
U.S. Cl. 198—232          11 Claims

ABSTRACT OF THE DISCLOSURE

An emergency brake for a conveyor in which the braking force is obtained by the engagement of the tapered rim of a brake disk with a groove in a brake shoe which shoe is wedged into engagement with the disk when the brake is applied.

Field of the invention

This invention relates generally to conveyors which transport passengers or objects along an inclined path and particularly to a novel brake for stopping the descent of such a conveyor upon failure of the mechanical connection between the conveyor proper and its power source.

Background

Typically a modern passenger conveyor operating between landings at different levels includes a passenger supporting member such as a series of small platforms or an endless belt extending between the landings and mechanically connected to a main drive wheel to be driven thereby. Such a drive wheel is normally driven by a flexible power transmitting member such as a belt or chain which in turn is driven by an electric motor through suitable speed reducing gearing. A spring applied, electromagnetically released service brake is arranged to act on the motor shaft and is used to hold all of the parts stationary when the conveyor is not in use. This same brake is also used to stop the conveyor in response to actuation of any one of a number of safety switches which may be located in various places such as along the skirt panels, adjacent to the comb plates, on the tension carriage, and where the handrail disappears into the balustrade. The service brake thus takes care of most emergencies but is incapable of stopping the descent of a heavily loaded conveyor in the event of failure of the belt or chain interconnecting the main drive wheel and the motor. Accordingly, it has been common practice to provide an emergency brake of some kind acting directly on the main driving wheel to stop its rotation upon breakage of the driving belt or chain. However, such prior emergency brakes have had a number of disadvantages. Some have been spring applied and electrically released with the result that they were applied every time the power was shut off. In some it has been difficult and/or time consuming to adjust the stopping force exerted. In others, no provision whatsoever has been made for adjusting the stopping force. Many prior known emergency brakes have been applied by the sudden engagement of a pawl with ratchet teeth, thereby causing severe jolts to the passengers when the brake has first been applied. Many prior brakes are complicated and expensive to manufacture.

It is a general object of the present invention to provide an improved brake for stopping the descent of a passenger conveyor upon failure of the driving belt or chain.

A more specific object is to provide an emergency brake for a passenger conveyor which minimizes the above mentioned disadvantages.

Summary

Briefly state, a preferred embodiment of a brake incorporating the invention comprises a brake disk formed with a tapered rim and fastened to the main drive wheel for rotation therewith. A brake shoe formed with a groove complementary to the tapered rim is mounted on a track for linear movement along an approximately tangential path. The shoe is urged by a spring along the path toward engagement with the disk but is normally held in a retracted position by a releasable latch. Upon breakage of the belt or chain, the latch is released whereupon the shoe is wedged between the brake disk and the track. A stop member limits the movement of the shoe and the extent of its engagement with the rim. Additionally, the inherent resiliency of the track allows it to deflect radially of the disk and thus helps to prevent the buildup of excessive forces.

Brief description of the drawing

For a clearer understanding of the invention reference may be made to the following detailed description and the accompanying drawing, in which.

Description of the preferred embodiment

Figures 1, 5, 6:
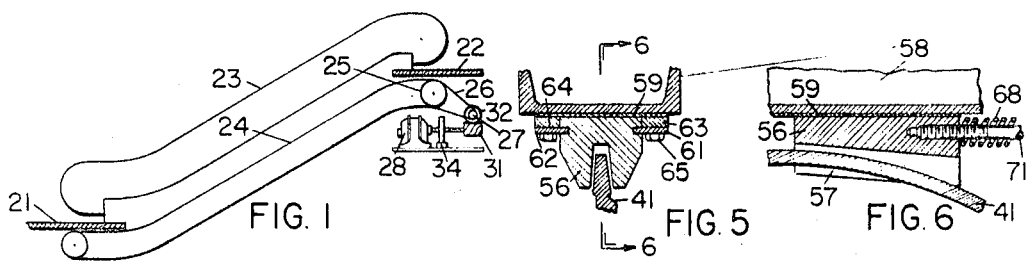
FIGURE 1 is a schematic view of a passenger conveyor.
FIGURE 5 is a cross section view taken on the line 5—5 of FIGURE 4.
FIGURE 6 is a cross section view taken on the line 6—6 of FIGURE 5.

Referring first to FIGURE 1 there is shown schematically a conveyor for transporting passengers along an incline between landings 21 and 22 which are at different levels. The conveyor includes a moving handrail 23 and a load supporting member 24 on which the passengers stand. The member 24, which is shown only schematically, may be an endless belt but, for the slope shown in FIGURE 1, is preferably a series of wheeled platforms or steps, propelled by a pair of chains which pass over sprockets (not shown in FIGURE 1) connected to a main drive wheel 25. The drive wheel 25 is rotated by a flexible power transmitting member which may be a belt but which preferably is a roller chain 26. This chain engages teeth formed on the periphery of the main drive wheel 25 and also engages the teeth of a sprocket wheel 27. This sprocket wheel is driven by a prime mover such as the electric motor 28 through speed reducing gearing comprising a worm 31 on the motor shaft which engages a worm wheel 32 fastened to the sprocket wheel 27.

A service brake 34 acts on a shaft of the motor 28 and is preferably of the spring applied, electromagnetically released type. As previously mentioned, the service brake is used to hold the parts stationary when the conveyor is not in use and is also used to stop the conveyor in response to various emergencies, such as upon a passenger's person or clothing becoming caught or entangled with any moving parts. However, if the chain 26 should break while passengers were on the conveyor, the brake 34 could not prevent the conveyor from descending rapidly.

Figure 2:
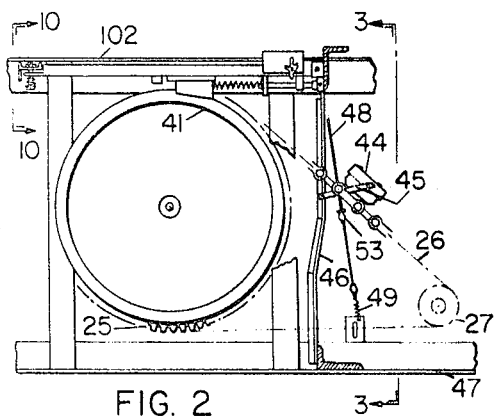
FIGURE 2 is an elevation view of an emergency brake in accordance with the invention.
Figure 3:
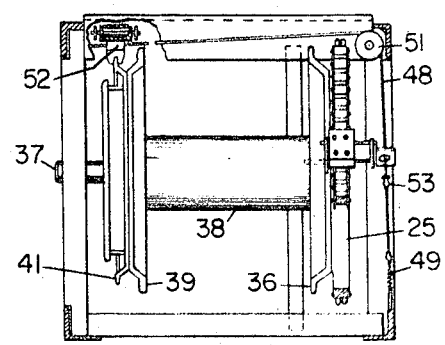
FIGURE 3 is a cross section view taken on the line 3—3 of FIGURE 2.

Referring now to FIGURES 2 and 3, a sprocket 36 is fastened to the main drive wheel 25 and both are freely rotatable about a shaft 37. Both are fastened to a hollow torque tube 38 which surrounds the shaft 37 and extends to the opposite side of the conveyor where it is fastened to another sprocket 39 and to a brake disk 41 so that both sprockets 36 and 39, the brake disk 41 and the main drive wheel 25 rotate as a unit. The sprockets 36 and 39 are for driving step chains on each side of the conveyor. These chains are of conventional construction and have been omitted from the drawing in order to show the remaining parts more clearly.

A weight 44 is normally supported by the chain 26 and is pivotally connected to a pair of links 45 which in turn are pivotally mounted to a brace 46 which is a portion of the frame 47. One of the links 45 includes a portion formed with an aperture through which passes a flexible cable 48, preferably one formed of many metal strands. One end of the cable 48 is fastened to a tension spring 49, the other end of which is fastened to the frame 47. The cable 48 passes over a pulley 51 to the opposite side of the conveyor where it is fastened to a latch mechanism 52. A collar 53 is fastened to the cable 48 just below the link 45. It is apparent that if the chain 26 should break, the weight 44 and the link 45 would drop, engaging the collar 53. As will be more fully explained, the resulting tension on the cable 48 releases the latch mechanism 52 so as to apply the emergency brake.

Figure 4:
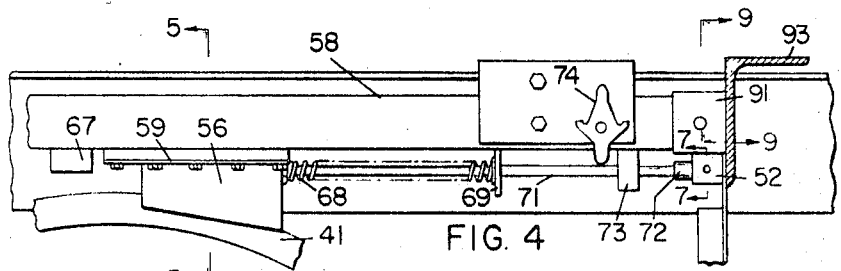
FIGURE 4 is a view to an enlarged scale of a portion of the apparatus shown in FIGURE 2.

Referring next to FIGURES 4, 5 and 6, the brake disk 41 is formed with a tapered rim which is thinnest at its edge, as best shown in FIGURE 5. A brake shoe 56 is formed with a complementary groove 57 that is, a groove the walls of which are inclined toward each other at substantially the same angle as are the surfaces of the rim of the disk 41. At its widest part, which is at the surface of the shoe 56 (at the bottom as viewed in FIGURES 4 to 6) the groove 57 is narrower than the thickest part of the rim but wider than the thinnest part. At its greatest depth (at the top as viewed in FIGURES 4 to 6) the groove is narrower than the thinnest part of the rim of the disk 41 which thinnest part is at its peripheral edge.

A structural channel member 58 is mounted with its legs upstanding and its web in an approximately horizontal position spaced above the upper edge of the brake disk 41 and substantially parallel to a tangent to the top of the rim of the disk 41. A thin, smooth, metallic, bearing 59 is positioned along the bottom of the web of the member 58. The brake shoe 56 is formed with a flat upper surface and with two substantially rectangular slots on opposite vertical side surfaces. These slots slidingly embrace the edges of two elongated rectangular guide bars 61 and 62. These bars are spaced from the plate 59 and the web of the channel member 58 by two additional elongated guide bars 63 and 64 which engage the top of the bars 61 and 62, the vertical side surfaces of the shoe 56, and the bottom of the plate 59. The channel member 58, along with the four bars and the plate constitutes a track along which the brake shoe 56 is linearly movable. The assembly is held together by bolts 65.

With the parts in the positions shown in the drawing, the walls of the groove 57 are not in engagement with the tapered rim of the disk 41 and the brake is not applied. In order to apply the brake, the shoe 56 is moved along the track 58 in the direction toward the disk 41 which is from right to left as viewed in the drawing. As best shown in FIGURE 6, the groove 57 is not parallel to the top of the shoe 56 and the bottom of the channel 58 but is inclined thereto, the distance of the groove from the top surface of the shoe increasing from left to right as viewed in FIGURES 4 and 6. The groove is in the same plane as its path of movement but is longitudinally inclined to that path in such a sense that as the shoe 56 moves from right to left, the space between the walls of the groove 57 and the rim of the disk 41 decreases until the parts engage. The disk 41 rotates counterclockwise when the conveyor is descending so that once engagement takes place, friction increases the movement of the shoe to the left and the shoe becomes wedged between the track 58 and the disk 41. Movement to the left is limited by a stop member 67 fastened to the track 58 in the path of movement of the shoe 56. The position of the stop member 67 is selected in conjunction with the depth of the groove 57 so that the periphery of the disk 41 never engages the bottom of the groove 57.

The brake shoe 56 is urged toward the disk 41 by a spring 68 acting between the shoe 56 and an abutment 69 fastened to the channel member 58. It is normally held in the position shown by a rod 71 one end of which is threaded to the shoe 56 and the other end of which is welded to a hollow tube 72 which tube in turn is held by the previously mentioned latch 52. When the latch is released, the rod 71 moves to the left under the urging of the spring 68 carrying with it a collar 73 which engages the actuator 74 of a switch (not shown) so that any desired indication and/or control operations can be initiated in response to operation of the brake.

Figures 7, 8:
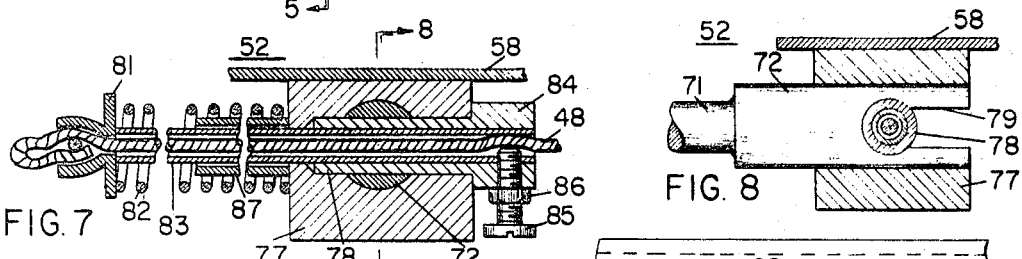
FIGURE 7 is a cross section view taken on the line 7—7 of FIGURE 4.
FIGURE 8 is a cross section view taken on the line 8—8 of FIGURE 7.

As best shown in FIGURES 7 and 8, the latch 52 comprises a block 77 rigidly fastened to the web of the channel member 58 and formed with two apertures which intersect each other at right angles. The tube 72 is held in one of the apertures by a hollow pin 78 which passes through the other aperture in the block 77 and through a radial aperture in the tube 72. The end of the tube 72 remote from the rod 71 is formed with an axial slot 79 which intersects the radial aperture therein but which is narrower than the diameter of the aperture.

The previously mentioned flexible cable 48 passes through the hollow pin 78 and extends a substantial distance beyond the end of the block 52. The end of the cable 48 is fastened to a fitting 81 for the purpose of which is to hold the end of the cable and also to form an abutment for a spring 82 which acts between the fitting 81 and the block 77 thereby urging the cable to the left, as viewed in FIGURE 7. A hollow tube 83 surrounds the cable 48 and extends from the fitting 81 to the end of a collar 84 formed on the end of the pin 78. A set screw 85 is threaded through the collar 84, passes through a radial aperture in the tube 83, is tightened so as to bear against the cable 48, and held in place by a lock nut 86, thereby fastening the pin 78, the tube 83 and the cable 48 together. Another hollow tube 87 surrounds the tube 83 in the region to the left of the block 77 and serves as a stop member.

In the operation of the latch 52, the spring 49 (FIGURES 2 and 3) urges the flexible cable 48 to the right, as viewed in FIGURE 7. However, the spring 82 overcomes the spring 49 and urges the cable 48 to the left to the position shown with the collar 84 engaging the block 77. Upon breakage of the chain 26, the weight 44 pulls the cable to the right until the fitting 81 engages the end of the tube 87 at which position the pin 78 is withdrawn sufficiently to release the tube 72 but not enough to become disengaged from the aperture in the block 77. The presence of the slot 79 allows the tube 72 to be withdrawn in spite of the fact that the cable 48 and the tube 83 remain in the aperture.

Figure 9:
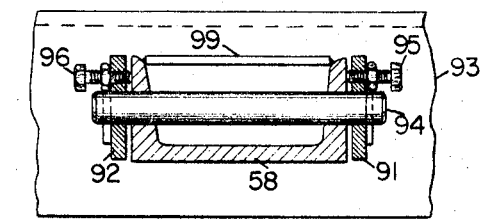
FIGURE 9 is a cross section view taken on the line 9—9 of FIGURE 4.

The right end of the channel member, or track, 58 is pivotally mounted. As best shown in FIGURES 4 and 9, two brackets 91 and 92 are welded or otherwise rigidly fastened to a structural angle member 93 which is a portion of the framework. A pin 94 passes through apertures in the brackets 91, 92 and through the legs of the track 58. Machine screws 95 and 96 are threaded through the brackets 91 and 92 and bear against the legs of the channel member 58 to provide for adjustment of its lateral position so as to be sure the groove in the brake shoe 56 is aligned with the rim of the disk 41. Also shown in FIGURE 9 is a flat reinforcing bar 99 welded to the legs of the channel member 58.

Figure 10:
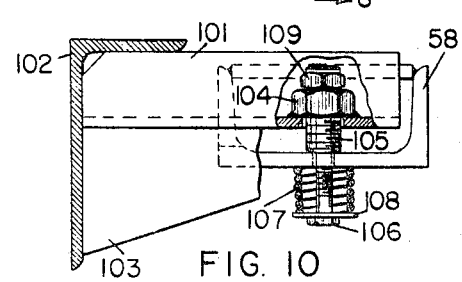
FIGURE 10 is a cross section view taken on the line 10—10 of FIGURE 2.

The left end of the track 58 is adjustably fastened to the frame. As best shown in FIGURE 10, a short structural channel member 101 is positioned with its legs upstanding and is welded to a structural angle member 102, which angle member is a portion of the stationary framework. A generally triangular brace 103 is welded to the bottom of the channel 101 and to the angle member 102. The channel member 101 is formed with an aperture in its web and a nut 104 is welded to the web in registration with the aperture. A sleeve 105 is formed with external threads over its entire length, with internal threads on the bottom, and with a hexagonal recess on top for receiving a hexagonal wrench. The sleeve 105 is threaded into the nut 104 and extends below the channel 101 and into engagement with the track 58. The track 58 is formed with an aperture through which a bolt 106 extends with a free fit and which is threaded into the sleeve 105. A spring 107 is held between the bottom of the track 58 and a flat washer 108 on the bolt 106. The bolt 106 is not an adjustment but is simply pulled up tight. The vertical position of the track 58 is adjusted by rotating the sleeve 105 with a hexagonal wrench, after which it may be held in position by a lock nut 109.

During normal operation of the conveyor, the parts occupy the relative positions shown in the drawing. Upon breakage of the chain 26, the link 45 engages the collar 53 thereby pulling the cable 48 against the urging of the spring 82 so as to retract the pin 78 releasing the latch 52 and freeing the tube 72 whereupon the spring 68 moves the brake shoe 56 to the left where it is resiliently wedged the track 58 and the rim of the disk 41 with the walls of the groove 57 engaging the tapered rim of the disk 41 thereby stopping the conveyor.

It might be thought at first glance that excessive, or even destructive, forces might be generated by such a wedging action. However, the magnitudes of the forces generated are limited by three factors. First, the stop member 67 limits the leftward movement of the brake shoe 56 thereby limiting the extent of its engagement with the brake disk 41. Second, by adjusting the sleeve 105 the track 58 is rotated about the pivot pin 94 thereby selecting the elevation of both the left end and of the intermediate portion of the track 58 in the vicinity of the disk 41 thereby further selecting and limiting the extent of the engagement of the brake shoe 56 with the brake disk 41. Third, the track 58 is inherently resilient and it has been found that, when the brake shoe 56 engages the disk 41, the track 58 deflects upwardly a significant amount thereby diminishing the extent of the engagement of the shoe 56 with the disk 41.

From the above it is apparent that the present invention provides an improved brake for stopping a conveyor upon failure of the main driving chain. The brake is inexpensive to make because only simple, easily manufactured parts are used. It is entirely mechanical in operation. The stopping distance can be varied simply by a single adjustment, namely, the sleeve 105.

Although a preferred embodiment of the invention has been described in considerable detail for illustrative purposes, many modifications can be made within the spirit of the invention. It is therefore desired that the protection afforded by Letters Patent be limited only by the true scope of the appended claims.

What is claimed is:

1. A conveyor comprising a load supporting member, a main drive wheel for driving said member, a prime mover, a flexible power transmitting member interconnecting said drive wheel and said prime mover, a brake disk formed with a tapered rim and fastened to said drive wheel for rotation therewith, a brake shoe formed with at least one tapered wall complementary to said tapered rim, guide means fixedly positioned adjacent to said disk, said guide means having a bearing surface engaging said shoe for guiding said shoe along said bearing surface between said guide means and said disk, and brake applying means responsive to breakage of said flexible power transmitting member, said brake applying means being operative to apply a force directly against said shoe for wedging said shoe between said guide means and said disk with said wall engaging said rim.

2. A conveyor according to claim 1 in which said guide means is a resilient member for resiliently wedging said shoe into engagement with said disk.

3. A conveyor comprising a load supporting member, a main drive wheel for driving said member, a prime mover, a flexible power transmitting member interconnecting said drive wheel and said prime mover, a brake disk formed with a tapered rim and fastened to said drive wheel for rotation therewith, a brake shoe formed with a groove including tapered walls complementary to said tapered rim, means responsive to breakage of said flexible power transmitting member for wedging said shoe into engagement with said disk with said walls engaging said rim, and a stop member mounted to limit the extent of the engagement of said shoe with said rim of said disk.

4. A conveyor according to claim 2 including a track mounted adjacent to said rim of said brake disk, means for mounting said brake shoe for linear movement along said track, and brake applying means for urging said shoe along said track in a direction toward said brake disk so that the inherent resilience of said track causes it to yield in a radial direction whereby said shoe is resiliently wedged between said track and said rim.

5. A conveyor according to claim 4 in which said track is mounted parallel to but radially spaced from a tangent to said rim of said disk and which includes means for mounting said shoe to said track in such a position that said groove is substantially coplanar with but inclined to its path of movement whereby the contact pressure between the walls of said groove and the surfaces of said rim increases as the shoe traverses the track in a direction toward said disk.

6. A conveyor according to claim 5 in which said stop member is mounted on said track in such a position as to limit the movement of said shoe as it travels in the brake applying direction toward said disk.

7. A conveyor according to claim 6 including a pivotal mechanism for pivotally supporting one end of said track and also including an adjustable mechanism for supporting the other end of said track and for adjusting the angular position of said track about said pivotal mechanism and for simultaneously varying the distance of an intermediate portion of said track from said brake disk, which variation varies the stopping force exerted by said brake shoe against said brake disk.

8. A conveyor according to claim 7 in which said pivotal mechanism includes means for adjusting the position of said track in a direction parallel to the pivot axis so as to align said groove in said brake shoe with said rim of said brake disk.

9. A conveyor according to claim 7 including a spring for urging said brake shoe along said track toward engagement with said brake disk and also including a latch mechanism for normally holding said shoe in a retracted position despite the urging of said spring.

10. A conveyor according to claim 9 in which said latch mechanism includes a tube fastened to said brake shoe and held in a retracted position by a pin passing through an aperture formed in said tube.

11. A conveyor according to claim 10 in which said means responsive to breakage includes a weight normally supported by said flexible power transmitting member and also includes a flexible cable operatively interconnecting and weight and said pin whereby breakage of said flexible power transmitting member allows said weight to fall thereby retracting said pin.

References Cited

UNITED STATES PATENTS

| 1,208,537 | 12/1916 | Gemlo | 198—232 X |
| 1,625,103 | 4/1927 | Smith | 188—74 |
| 2,259,366 | 10/1941 | Dunlop | 198—232 X |

FOREIGN PATENTS 453,181  11/1927  Germany.

EDWARD A. SROKA, Primary Examiner

U.S. Cl. X.R.

198—16